(12) United States Patent
Korala

(10) Patent No.: US 9,990,797 B2
(45) Date of Patent: Jun. 5, 2018

(54) USER TERMINAL SYSTEM AND METHOD

(71) Applicant: KORALA ASSOCIATES LIMITED, Edinburgh (GB)

(72) Inventor: Aravinda Korala, Edinburgh (GB)

(73) Assignee: KORALA ASSOCIATES LIMITED, Edinburgh (GB)

( * ) Notice: Subject to any disclaimer, the term of this patent is extended or adjusted under 35 U.S.C. 154(b) by 0 days. days.

(21) Appl. No.: 14/435,412

(22) PCT Filed: Oct. 11, 2013

(86) PCT No.: PCT/GB2013/000427
§ 371 (c)(1),
(2) Date: Apr. 13, 2015

(87) PCT Pub. No.: WO2014/057237
PCT Pub. Date: Apr. 17, 2014

(65) Prior Publication Data
US 2015/0269805 A1    Sep. 24, 2015

(30) Foreign Application Priority Data
Oct. 13, 2012 (GB) .................................. 1218489.1

(51) Int. Cl.
*G06F 1/24* (2006.01)
*G07F 7/10* (2006.01)
(Continued)

(52) U.S. Cl.
CPC ............ *G07F 7/1016* (2013.01); *G06F 21/83* (2013.01); *G06F 21/86* (2013.01); *G06F 21/87* (2013.01);
(Continued)

(58) Field of Classification Search
CPC .... G07F 7/1016; G07F 7/1033; G07F 7/1091; G06F 21/83; G06F 21/86; G06F 21/87
See application file for complete search history.

(56) References Cited

U.S. PATENT DOCUMENTS 4,997,288 A * 3/1991 Rosenow .................. G06F 1/30
380/2
6,292,899 B1 * 9/2001 McBride ............. G06F 21/6209
380/281
(Continued)

FOREIGN PATENT DOCUMENTS

EP    1152378 A2    11/2001
EP    1271427 A3    1/2003
(Continued)

OTHER PUBLICATIONS

International Search Report for International Application No. PCT/GB2013/000427 dated Jan. 29, 2014.
(Continued)

*Primary Examiner* — Sharon Lynch
(74) *Attorney, Agent, or Firm* — Womble Bond Dickinson (US) LLP

(57) ABSTRACT

A user terminal comprises an encryption apparatus, a tamper detection system associated with the encryption apparatus and means for triggering the tamper detection system in response to tampering with the encryption apparatus, at least one further component, and further means for triggering the tamper detection system, wherein the further means for triggering the tamper detection system is configured to trigger the tamper detection system in response to tampering with the at least one further component.

22 Claims, 8 Drawing Sheets

(51) Int. Cl.
  *G06F 21/86* (2013.01)
  *G06F 21/87* (2013.01)
  *G06F 21/83* (2013.01)
(52) U.S. Cl.
  CPC .......... *G07F 7/1033* (2013.01); *G07F 7/1091* (2013.01)

(56) References Cited

U.S. PATENT DOCUMENTS

| | | | | |
|---|---|---|---|---|
| 6,390,367 | B1 * | 5/2002 | Doig | G07F 19/20 235/379 |
| 6,473,861 | B1 * | 10/2002 | Stokes | G11B 20/00086 713/193 |
| 6,715,078 | B1 * | 3/2004 | Chasko | G06F 21/34 713/182 |
| 6,917,299 | B2 * | 7/2005 | Fu | G06F 21/86 340/3.3 |
| 7,343,496 | B1 * | 3/2008 | Hsiang | G06F 21/572 257/922 |
| 7,481,360 | B1 * | 1/2009 | Ramachandran | G06Q 20/18 235/379 |
| 7,597,261 | B2 * | 10/2009 | Aviv | G06K 7/0091 235/439 |
| 7,784,691 | B2 * | 8/2010 | Mirkazemi-Moud | G06K 7/084 235/380 |
| 7,850,073 | B1 * | 12/2010 | Ramachandran | G06Q 20/18 235/379 |
| 7,878,397 | B2 * | 2/2011 | Mirkazemi-Moud | G06K 7/0091 235/380 |
| 7,896,228 | B1 * | 3/2011 | Motz | G06Q 20/042 235/375 |
| 7,898,413 | B2 * | 3/2011 | Hsu | G06F 21/86 340/568.1 |
| 8,011,575 | B1 * | 9/2011 | Ramachandran | G06Q 20/18 235/375 |
| 8,167,057 | B2 * | 5/2012 | Gabelich | G11C 11/16 173/194 |
| 8,342,397 | B1 * | 1/2013 | Ramachandran | G06Q 20/18 235/375 |
| 8,358,218 | B2 * | 1/2013 | Neo | G08B 21/185 340/541 |
| 8,540,142 | B1 * | 9/2013 | Lewis | G06Q 40/02 235/379 |
| 8,631,475 | B1 * | 1/2014 | O'Malley | H04L 63/12 726/5 |
| 8,632,001 | B1 * | 1/2014 | Ramachandran | G06Q 20/18 235/375 |
| 9,213,869 | B2 * | 12/2015 | Yanko | G06K 7/083 |
| 9,373,114 | B2 * | 6/2016 | Lewis | G07F 19/205 |
| 2001/0033012 | A1 * | 10/2001 | Kommerling | G06F 21/86 257/679 |
| 2002/0066020 | A1 * | 5/2002 | Whytock | G07F 7/10 713/191 |
| 2002/0199111 | A1 * | 12/2002 | Clark | G06F 21/87 713/194 |
| 2003/0047433 | A1 * | 3/2003 | Moree | G06F 21/83 200/50.01 |
| 2004/0134980 | A1 * | 7/2004 | Flood | E05B 47/06 235/379 |
| 2004/0200894 | A1 * | 10/2004 | Ramachandran | G06Q 20/18 235/379 |
| 2005/0211766 | A1 * | 9/2005 | Robertson | G06Q 20/3674 235/380 |
| 2006/0049255 | A1 * | 3/2006 | von Mueller | G06F 21/72 235/449 |
| 2006/0049256 | A1 * | 3/2006 | von Mueller | G06F 21/72 235/449 |
| 2006/0108668 | A1 * | 5/2006 | Knudsen | G11C 8/20 257/659 |
| 2007/0016963 | A1 * | 1/2007 | Robinson | G06F 21/86 726/34 |
| 2007/0204173 | A1 * | 8/2007 | Kuhn | G06F 21/83 713/194 |
| 2008/0072071 | A1 * | 3/2008 | Forehand | G06F 21/34 713/193 |
| 2008/0135617 | A1 * | 6/2008 | Aviv | G06K 7/0091 235/449 |
| 2008/0278353 | A1 * | 11/2008 | Smith | G06F 3/0202 341/22 |
| 2008/0296378 | A1 * | 12/2008 | Aviv | G06K 7/0091 235/449 |
| 2008/0315989 | A1 * | 12/2008 | Mirkazemi-Moud | G06K 7/084 340/5.66 |
| 2009/0119221 | A1 * | 5/2009 | Weston | G06Q 20/382 705/76 |
| 2009/0127336 | A1 * | 5/2009 | Mirkazemi-Moud | G06K 7/0091 235/449 |
| 2010/0181999 | A1 * | 7/2010 | Sudai | G06F 21/86 324/239 |
| 2010/0250957 | A1 * | 9/2010 | Cuppett | G06F 21/32 713/186 |
| 2011/0279279 | A1 | 11/2011 | Mirkazemi-Moud et al. | |
| 2011/0321173 | A1 * | 12/2011 | Weston | G06F 21/554 726/27 |
| 2012/0047374 | A1 * | 2/2012 | Klum | G06F 21/86 713/192 |
| 2013/0140364 | A1 * | 6/2013 | McJones | G06K 7/082 235/449 |
| 2014/0041060 | A1 * | 2/2014 | Selwood | G06F 21/83 726/34 |
| 2014/0081874 | A1 * | 3/2014 | Lewis | G07F 19/205 705/72 |
| 2014/0136415 | A1 * | 5/2014 | Ramachandran | G06Q 20/18 705/44 |
| 2014/0289133 | A1 * | 9/2014 | Weston | G06F 21/554 705/72 |

FOREIGN PATENT DOCUMENTS

| | | |
|---|---|---|
| EP | 1 160 647 B1 | 10/2007 |
| GB | 2468720 A | 9/2010 |
| WO | 2009149715 A1 | 12/2009 |

OTHER PUBLICATIONS

Search Report dated Mar. 18, 2014 for Application No. GB1218489.1.

Examination Report dated Apr. 13, 2017 for Application No. GB1218489.1.

* cited by examiner

USER TERMINAL SYSTEM AND METHOD

FIELD OF THE INVENTION

The present invention relates to a user terminal that includes a tamper detection system, for example an Automated Teller Machine or other user terminal that is able to perform financial transactions.

BACKGROUND TO THE INVENTION

ATM terminals are very widely used, and allow users to withdraw cash and to perform other banking transactions. Usually, in order to withdraw cash a user inserts a financial transaction card, for example a credit or debit card, into an ATM terminal, enters a PIN code, and performs transactions via a sequence of screens displayed on the terminal.

As ATM terminals contain large quantities of cash, they usually include various security mechanisms to discourage theft. For example, ATM terminals are usually constructed to be physically strong and heavy to make removal, or breaking open, of the ATM difficult. More sophisticated anti-tampering mechanisms are also usually provided to ensure that any tampering with the ATM is detected and may cause shut down of the ATM or generation of an alarm. Many ATMs are embedded within the fabric of a building, for example embedded in an external wall, in order to discourage theft.

ATMs often also include encrypting PIN pads (EPPs). Such EPPs usually include a key entry device, which may be an electromechanical or touch-screen device, for entry of a PIN and an encryption module comprising a processor and a storage device that is operable to encrypt the PIN entered via the key entry device. In operation, the encrypted PIN is usually transmitted, together with other information such as a user or card identifier, via a network to a server associated with a financial institution. The server decrypts the PIN and, if the PIN is correct, sends an authorisation message back to the ATM.

In some known EPPs, a symmetric encryption scheme, for example the Data Encryption Standard (DES) is used to encrypt and decrypt PIN data. According to such schemes, the same key is used at the server and at the EPP to encrypt and decrypt the PIN. In order to program the key into the EPP, a portion of the key may be provided to separate people, for example employees of the financial institution, and each separately enters the portion of the key into the EPP, where it is stored for future use in encryption and decryption of PIN data.

In other known EPPs, a private key-public key encryption scheme is used to distribute a Master Key to an EPP, rather than relying on key entry in situ by employees of the financial institution. In such EPPs, a private key of a public key-private key encryption scheme may be embedded in the EPP during manufacture. A variety of known private key-public key encryption schemes may be used.

Known EPPs usually comprise a secure housing and a tamper detection system that is operable to detect attempts to tamper with the EPP, for example via physical interference with the secure housing or via attempted interference with or monitoring of the internal operation of the device for example using electro-magnetic radiation. In response to tampering being detected a key or keys stored at the EPP are deleted automatically. The deletion of a key or keys depends on the type of EPP device.

For example, in embodiments that include an embedded private key stored at manufacture, the symmetric key distributed to the EPP by the server may be deleted in response to detection of tampering, whilst the embedded private key may be retained. Once it has been determined that the EPP has survived the attempted tampering without significant alteration or impairment of operation, a further symmetric key can be encrypted by the server and distributed to the EPP, where it can be decrypted using the embedded private key. Alternatively, the private key may also be deleted, requiring subsequent replacement of the EPP.

In EPPs that rely only on a symmetric key entered, in parts, by two financial institution employees or other operatives, the detection of tampering can trigger deletion of the symmetric key from the EPP. Another symmetric key must then be provided to, and entered by, the financial institution employees or other operatives.

It is an aim of the present invention to provide an alternative tamper detection system for user terminals.

SUMMARY OF THE INVENTION

In a first aspect of the invention there is provided a user terminal comprising an encryption apparatus, a tamper detection system associated with the encryption apparatus and comprising means for triggering the tamper detection system in response to tampering with the encryption apparatus, at least one further component, and further means for triggering the tamper detection system, wherein the further means for triggering the tamper detection system is configured to trigger the tamper detection system in response to tampering with the at least one further component.

Thus increased security may be provided in an efficient manner by using a tamper detection system associated with a PIN encryption apparatus. Such increased security may be particularly useful in the case of user terminals that contain no or little cash, as it may enable improved security to be provided for such terminals in the absence of physically bulky and expensive cladding or other physical reinforcement.

Tampering may comprise, for example, at least one of attempting to enter, interfering with normal operation, modifying or damaging.

The encryption apparatus may comprise a PIN entry and encryption apparatus. The encryption apparatus may comprise an encrypting PIN pad (EPP). EPPs usually contain built-in anti-tampering systems and using such anti-tampering systems can provide a particularly efficient way of increasing the anti-tampering measures for the terminal or components of the terminal.

The further means for triggering the tamper detection system may comprise at least one detector for detecting tampering with the at least one further component.

The triggering of the tamper detection system of the encryption apparatus may comprise rendering the encryption apparatus temporarily or permanently unable to encrypt, for example temporarily or permanently unable to encrypt a PIN.

The triggering of the tamper detection system of the encryption apparatus may comprise modifying or deleting a key stored at the encryption apparatus. The key may comprise at least one of a session key, master key, or a private key.

The encryption apparatus may be within a housing and the at least one further component may be outside the housing.

The tamper detection system associated with the encryption apparatus may be configured to be triggered by tampering with the housing, for example the housing of the EPP.

The at least one further component may comprise a further housing, and the encryption apparatus may be located within the further housing.

The further means for triggering the tamper detection system may be configured to trigger the tamper detection system in response to at least one of opening or unlocking the further housing.

The means for triggering the tamper detection system may comprise a detector for detecting at least one of movement or pressure. The further housing may be arranged so that at least one of opening or unlocking the further housing causes the detector to detect at least one of movement or pressure thereby causing triggering of the tamper detection system.

The further housing may comprise an outer housing of the user terminal. Alternatively the further housing may be within the outer housing of the user terminal and may house selected components of the user terminal. Thus selected components of the user terminal may be subject to anti-tampering protection and other components, for example components that are desired to be accessible, for example for maintenance or replacement purposes, may not be subject to the additional anti-tampering protection.

The user terminal may comprise at least one of a motherboard, a CPU for controlling operation of the user terminal, a card reader, a touch screen and a printer located wholly or partly within the further housing.

The further housing may comprise an opening to allow access to a component within the further housing.

The user terminal may comprise a card reader located within the further housing, and the further housing may comprise an opening aligned with the card reader to allow insertion of a card through the further housing into the card reader.

The user terminal may comprise a printer located within the further housing, and the further housing may comprise an opening aligned with the printer to allow loading of paper into the printer.

The user terminal may comprise wiring connecting the EPP to a motherboard or CPU for controlling operation of the user terminal and the wiring may be located wholly within the further housing.

The at least one further component may comprise at least one of a motherboard, a CPU for controlling operation of the user terminal, a card reader, a touch screen and a printer.

The tamper detection system may comprise at least one electrical, magnetic, electromagnetic or optical detection system for detecting a change in an electrical property, a magnetic property, optical or other electromagnetic property indicative of tampering.

The at least one detection system may comprise at least one of a resistive, inductive or capacitive detector and/or at least one switch or relay.

The user terminal may comprise an activation device and/or a deactivation device for activating and/or deactivating the further tamper detection system.

The user terminal may comprise a payment terminal, an automated fuel dispenser, or a product dispensing machine.

The user terminal may comprise an Automated Teller Machine (ATM).

In a further, independent aspect of the invention there is provided a method of detecting tampering with a user terminal that comprises a tamper detection system associated with an encryption apparatus of the user terminal, the method comprising triggering the tamper detection system associated with the encryption apparatus in response to tampering with at least one further component of the user terminal.

The method may comprise rendering the encryption apparatus temporarily or permanently unable to encrypt, for example temporarily or permanently unable to encrypt a PIN. The method may comprise modifying or deleting a key stored at the encryption apparatus. The key may comprise at least one of a session key, a master key, or a private key.

The method may comprises detecting a change in an electrical, magnetic, or optical or other electromagnetic property indicative of tampering.

The method may comprise activating and/or deactivating the further tamper detection system.

In a further, independent aspect of the invention there is provided an encryption apparatus comprising a housing, a tamper detection system within the housing, and an input configured so that, in operation, application of a trigger signal to the input causes triggering of the tamper detection system. The input may be accessible externally of the housing. The application of the trigger signal may occur outside the housing. The input may comprise a wired or wireless input. The input may comprise an electrical connection, for example a wire or conducting track.

In another, independent aspect of the invention there is provided a method of modifying a user terminal that comprises a housing, an encryption apparatus within the housing and a tamper detection system associated with the encryption apparatus, the method comprising adding a connection to the tamper detection system, wherein one end of the connection is accessible externally of the housing, and the connection is configured such that, in operation, application of a trigger signal to the connection causes triggering of the tamper detection system.

In another independent aspect of the invention there is provided a computer program product comprising computer readable instructions that are executable to perform a method as claimed or described herein.

There may also be provided an apparatus or method substantially as described herein with reference to the accompanying drawings.

Any feature in one aspect of the invention may be applied to other aspects of the invention, in any appropriate combination. For example, apparatus features may be applied to method features and vice versa.

DETAILED DESCRIPTION OF EMBODIMENTS

Embodiments of the invention are now described, by way of non-limiting example, and are illustrated in the following figures, in which.

Embodiments of the invention can be implemented in a variety of user terminals, for example ATMs or other types of user terminals that can be used for the purchase and/or dispensing of goods and services.

Embodiments are able to provide improved security for user terminals by using a tamper detection system, for example associated with an existing EPP included in the user terminal.

Figure 1:
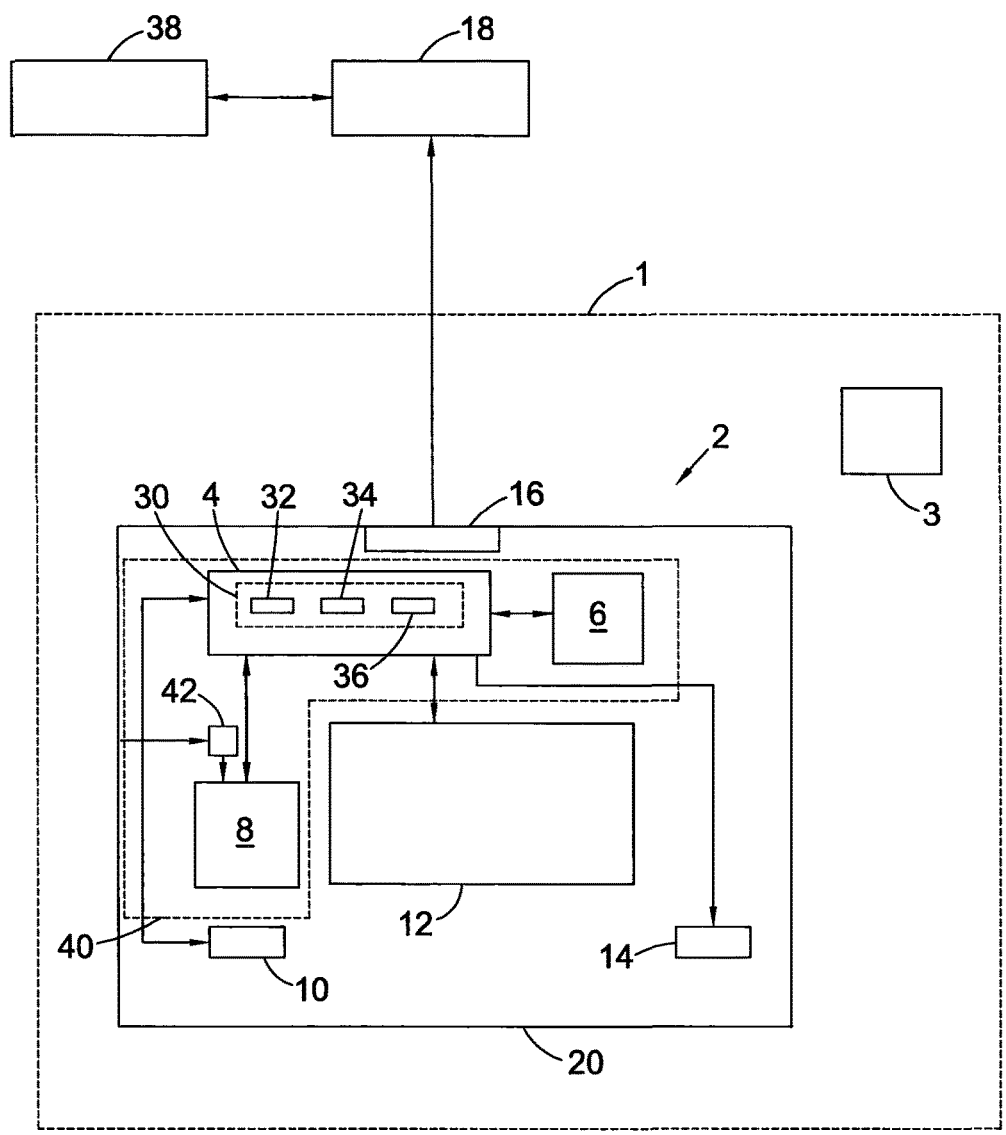
FIG. 1 is a schematic illustration of a user terminal according to an embodiment.

A user terminal 2 in accordance with an embodiment is illustrated schematically in FIG. 1. The user terminal 2 includes a processor 4 connected to a data store 6. The processor 4 is also connected to an encryption apparatus in the form of an encrypting pin pad (EPP) 8, a card reader device 10, a display 12 and a printer 14. The user terminal also includes a cash store, for example a safe, and a cash dispensing mechanism for dispensing cash from the cash store. The cash store and the cash handling mechanism are not shown in FIG. 1 for clarity.

In the embodiment of FIG. 1, the processor comprises a Windows PC core. The data store 6 comprises a hard disk, the card reader device 10 is an Omron V2BF-01JS-AP1 card reader, the display 12 is a touchscreen display and the printer 14 is an Epson M-T532, MB520. The EPP 8 comprises a PCI-compliant number pad and is operable to securely receive a PIN entered by a user.

Although particular component types and models are included in the embodiment of FIG. 1, any suitable component types and models may be used in alternative embodiments.

The user terminal 2 also includes a communication interface 16 that is configured to enable the user terminal to transmit messages to and receive messages from a server 18 associated with the user terminal network operator responsible for installation and operation of the user terminal 2. The messages are transmitted and received via a secure network connection in accordance with known banking protocols.

The user terminal network operator may be a financial institution, for example a bank. The messages sent between the user terminal 2 and the server 18 may relate to a particular transaction, and may comprise for example authorisation messages or messages comprising instructions to credit or debit an account in relation to a transaction conducted by a user using user terminal 2. In addition, the server 18 can send software installation or update messages that comprise software components for automatic installation at the user terminal 2. The user terminal 2 is also able to send management information to the server 18, comprising for example data representing usage of the user terminal during a particular period, or fault monitoring data.

In operation, the processor 4 controls operation of the other components of the user terminal 2, under control of application components running on the processor. Upon power-up of the user terminal 2 a basic input-output system (BIOS) is booted from non-volatile storage (not shown) included in the processor 4, and a Windows 7 operating system and application components are installed from the data store 6 by the processor 4 to form a user terminal processing system.

The application components include various application modules 32, 34, 36 that form part of a user terminal application 30 that controls operations relating to user interaction with the user terminal.

The user terminal application 30 forms part of an application layer and is provided under an XFS-compatible application environment, which may be a hardware-agnostic application environment such as KAL Kalignite or a manufacturer-specific application environment.

The software architecture of the user terminal 2 includes various other layers, in accordance with known ATM-type device architectures, including an XFS layer that mediates between the application layer and a hardware device layer. The hardware device layer includes various hardware-specific drivers for controlling operation of the various hardware components of the user terminal 2.

In operation, the user terminal application 30 controls operation of the user terminal 2, including operations associated with performance of a financial transaction by a user such as, for example, reading of the user's card, reading of a user's PIN, receipt and processing of a user's data such as account balance, overdraft limit and withdrawal limit from server 18, and display of a sequence of display screens on the display 12.

In FIG. 1, three application modules 32, 34 and 36 forming part of the application 30 are shown. The application module 32 controls communication with the server 18, and the processing of data associated with a transaction, including user data received from the server 18. The application module 34 controls the display of transaction screens on the display 12, including selecting and outputting the appropriate transaction screen for a particular point in a transaction process. The application module 36 controls the output of cash to a user via the cash dispensing mechanism at the end of the transaction process. Whilst particular modules 32, 34, 36 are described in relation to FIG. 1, in alternative embodiments functionality of one or more of those modules can be provided by a single module or other component, or functionality provided by a single module can be provided by two or more modules or other components in combination.

Turning to security features of the user terminal 2, the terminal includes an outer housing 20, and the other components of the user terminal 2 are located within the outer housing 20. Known security measures, for example sensors, triggers or switches that operate automatically in case of unauthorised tampering with the housing 20 may be provided.

It is a feature of the embodiment of FIG. 1 that in addition to the outer housing 20, there is provided a further, inner housing 40 that encloses various components of the user terminal. In this case, the processor 4, the data store 6, and the EPP 8 and wiring connecting those components are included in the inner housing 40. The display 12, the printer 14, the card reader device 10, and the communication interface 16 are located outside the inner housing 40 in the embodiment illustrated in FIG. 1.

A detector in the form of tamper detection device 42 is also included in the inner housing 40. The tamper detection device 42 comprises tamper detection circuitry (not shown) and a power source, for example a battery, for powering the tamper detection circuitry. The tamper detection device 42 provides means for triggering a tamper detection system associated with the EPP.

In the embodiment of FIG. 1, the inner housing comprises a lid portion and a body portion, the lid portion being removably attached to the body portion using screws, bolts or other suitable attachment devices. The inner housing 40 includes a tamper detection mechanism (not shown) that comprises a spring that is located such as to be under compression when the lid portion is attached to the body portion of the inner housing 40. The spring contacts, directly or indirectly, an electrical circuit element forming part of the tamper detection circuitry of the tamper detection device 42.

In operation, any attempt to remove or loosen the lid portion of the inner housing 40 causes the spring to act on the electrical circuit element and alter electrical properties of the tamper detection circuitry. In the embodiment of FIG. 1, the tamper detection device 42 includes an output (in this case an output wire) that is connected to the tamper detection circuitry, and alteration of the electrical properties of the tamper detection circuitry due to tampering with the inner housing causes a signal level on the output of the tamper detection device 42 to change.

The output of the tamper detection device 42 is connected to an input of the EPP 8, for example an input line or input connector.

EPPs, for example the EPP used in the embodiment of FIG. 1, generally include a processing resource for receiving and encrypting PIN entry data, and outputting the encrypted data. EPPs store at least one key for encrypting the PIN entry data. In the embodiment of FIG. 1, the EPP includes a private key that is embedded in the EPP during manufacture, and a further key of a symmetric encryption scheme. The further key is received from a server in encrypted form, then decrypted using the private key, and stored. The further key is used by the processing resource of the EPP to encrypt the PIN entry data.

EPPs usually include a secure housing and a tamper detection system that enables detection of tampering with the housing. In the embodiment of FIG. 1, the tamper detection system communicates with the processing resource and, if tampering with the EPP is detected by the tamper detection system, the tamper detection system is triggered. The processing resource then causes the deletion or modification of the further key from the data store in response to the tampering.

Thus, tampering with the EPP causes the EPP to be rendered temporarily or permanently unable to encrypt, for example, PIN entry data.

It is a feature of the embodiment of FIG. 1 that the EPP 8 is configured so that tampering with the inner housing 40 causes a change in the signal level on the output of the tamper detection device 42, which in turn triggers the tamper detection system of the EPP 8, causing the deletion or modification of the further key stored at the EPP 8. Thus, additional security can provided for the user terminal 2 taking advantage of the anti-tampering measures included in the EPP 8. That can provide a simple, and cost-effective way of increasing the security of the user terminal 2 without requiring the installation of bulky and expensive additional physical reinforcement.

In the embodiment of FIG. 1, the EPP 8 includes a trigger input (either wired or wireless) that can be used to trigger the tamper detection system of the EPP. Such a trigger input is, in some cases, a wire that connects to the appropriate point in the EPP circuitry such that a change in signal level on the wire by at least a predetermined threshold amount causes the triggering of the tamper detection system of the EPP.

In another embodiment, the EPP is an EPP that includes a detector in the form of a pressure sensor and associated button, and pressing (or release) of the button causes detection of pressure above (or below) a threshold level of pressure by the pressure sensor and consequently the triggering of the tamper detection system of the EPP. One such embodiment is illustrated in FIGS. 2 to 7.

Figure 2:
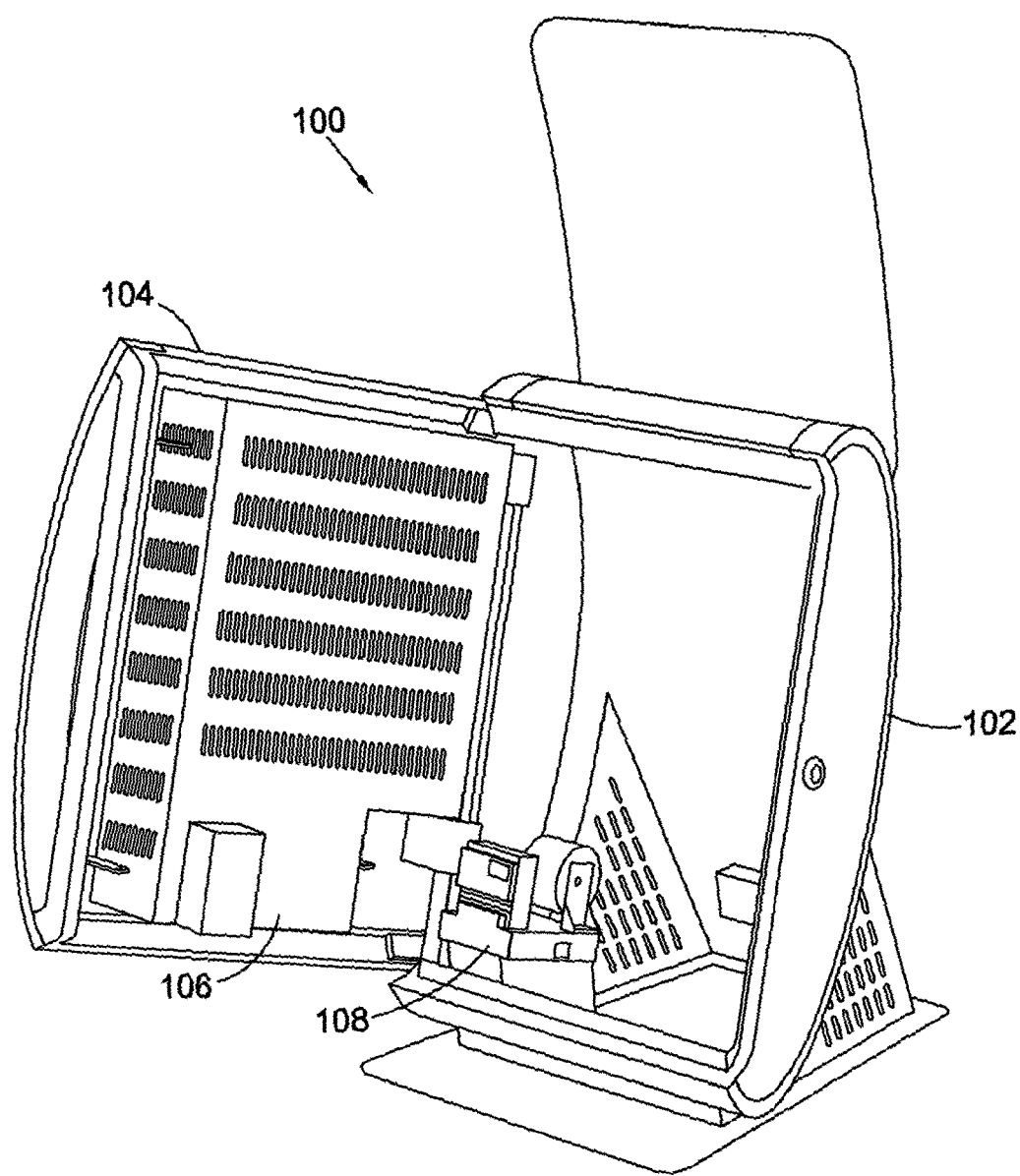
FIGS. 2 to 7 are illustrations of a user terminal, or components thereof, according to a further embodiment.

FIG. 2 shows a user terminal 100 comprising an outer housing 102. The front cover 104 of the outer housing has been unlocked and is open in FIG. 2. The front cover 104 of the user terminal is shown in an unlocked and open state in FIG. 2.

The user terminal 100 also includes a further housing 106 forming a secure box. The user terminal 100 includes various other components including a printer 108, which can be seen outside the further housing 106 in FIG. 2.

Figure 3:
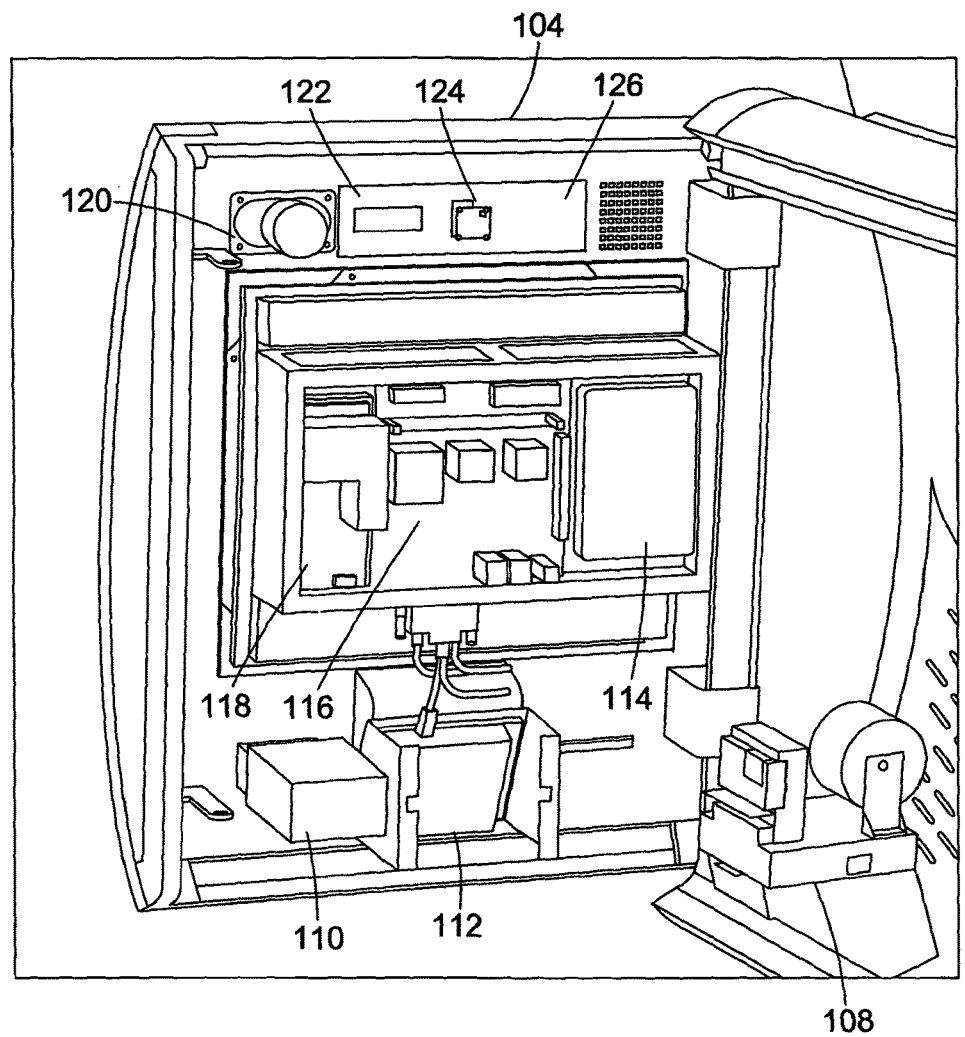
Figure 4A:
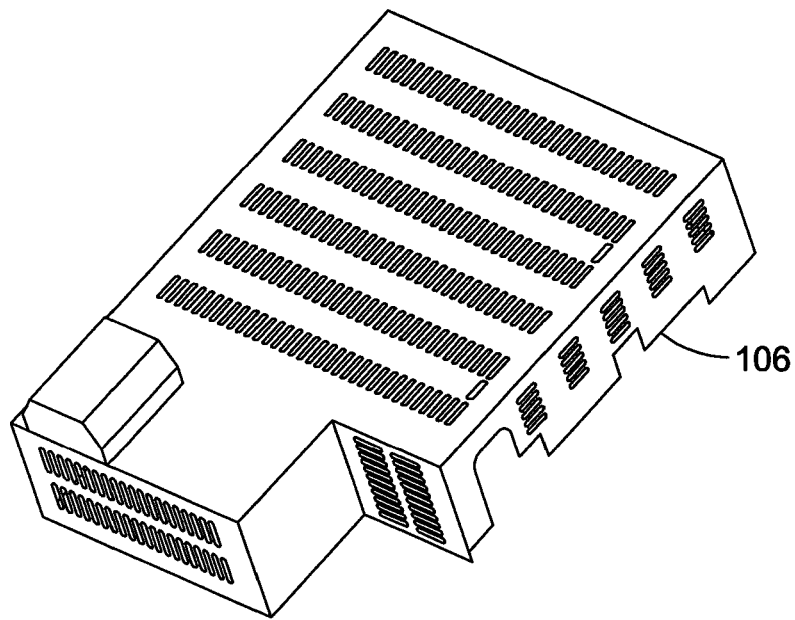
Figure 4B:
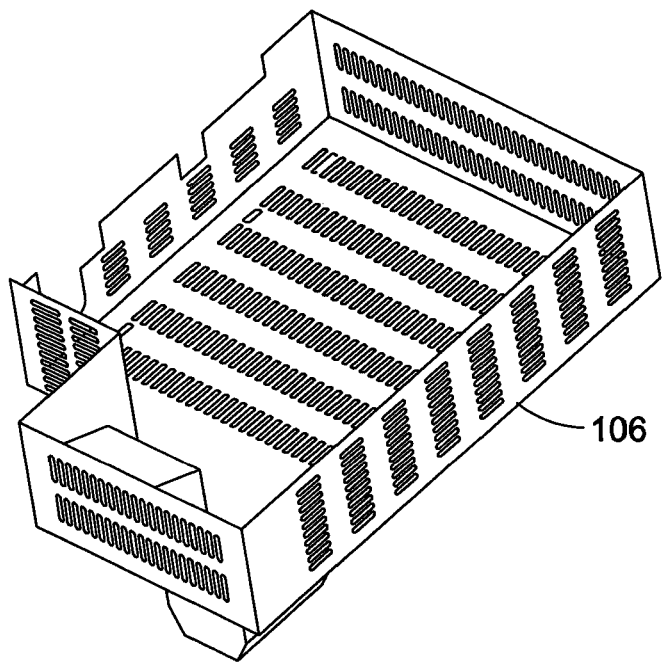
Figure 5:
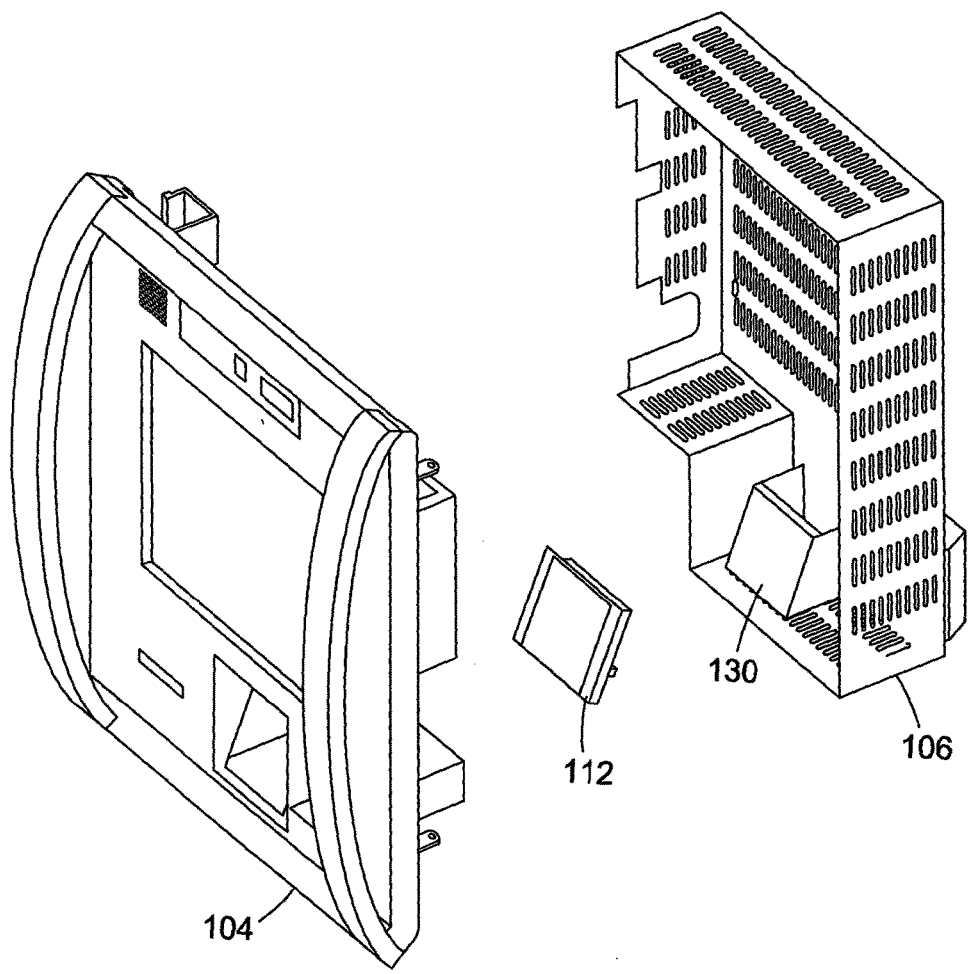

FIG. 3 shows further components of the user terminal 100 mounted on the rear of the front cover 104, with the further housing 106 removed. The further components include a card reader device 110, an EPP 112, a hard disk drive (HDD) 114, a mainboard 116 comprising processing circuitry for controlling operation of the user terminal 100, power circuitry 118, a speaker 120, a bar code reader 122, a camera 124, and an RFID reader device 126. FIGS. 4a and 4b are illustrations of the further housing 106 when not attached to the front cover 104 and thus in an open state. FIG. 5 is an exploded view of the front cover 104, EPP 112 and further housing 106. The further housing 106 includes an engagement surface 130 that engages with the rear surface of the EPP 112 when the further housing 106 is attached to the front cover 104 of the user terminal. Thus, the engagement surface 130 engages with the rear surface of the EPP 112 when the further housing is in a closed state.

Figure 6:
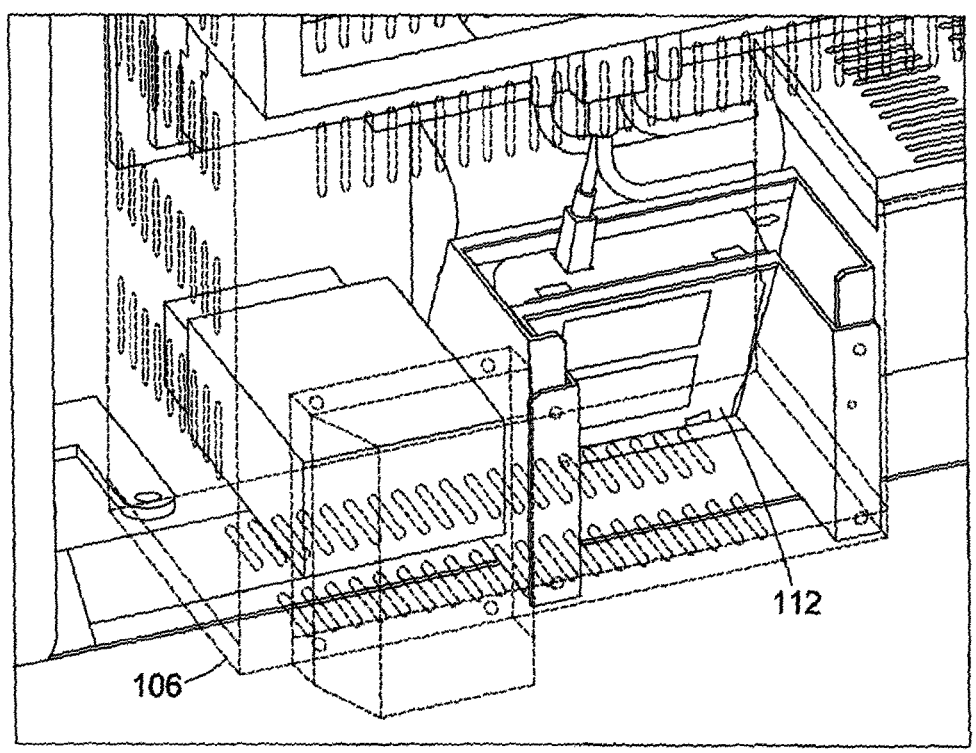
Figure 7:
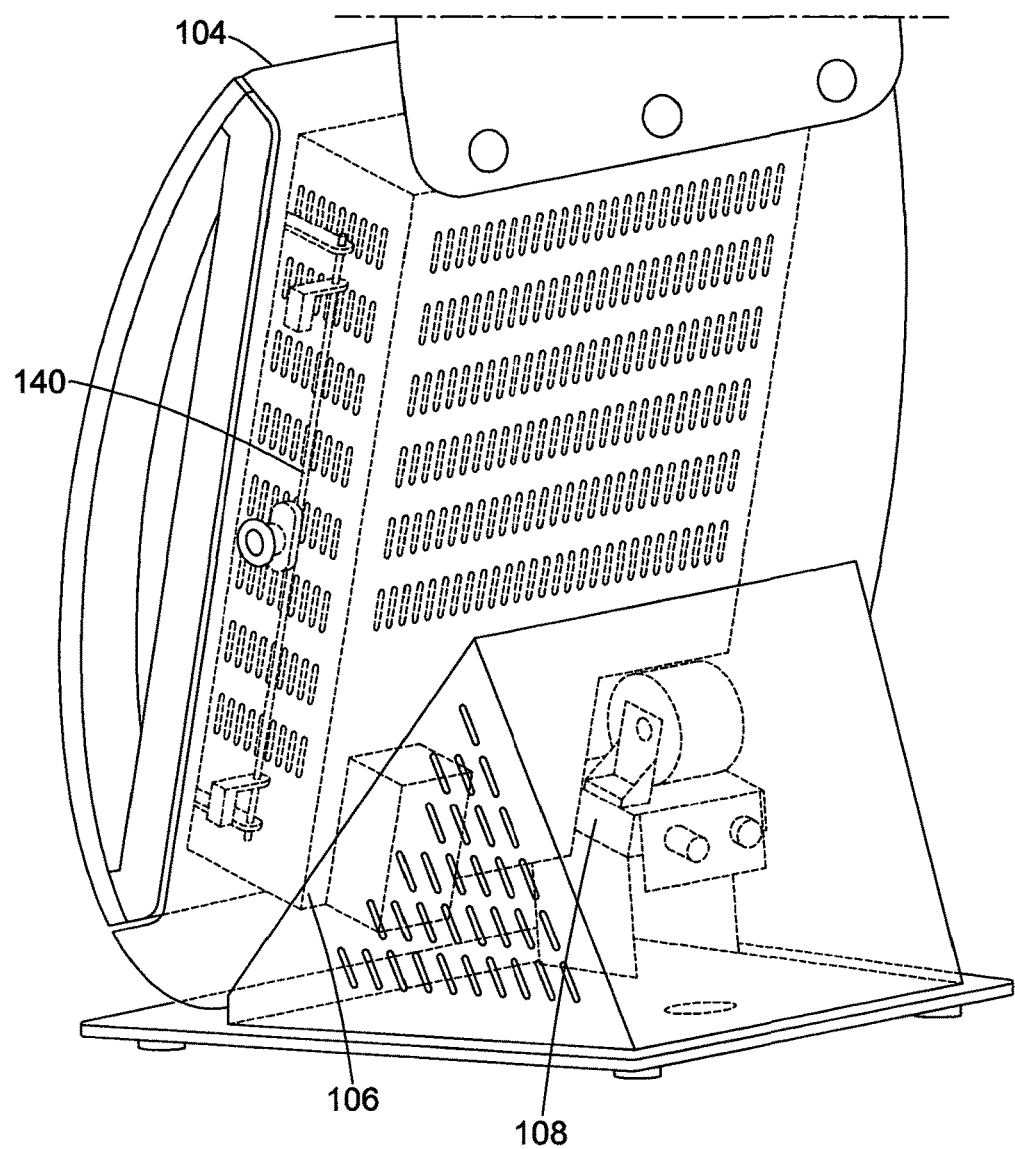

FIG. 6 is a view of the further housing 106 (in wire-frame representation) attached to the front cover 104 of the user terminal 100 and thus in a closed state. FIG. 7 is a further view of the further housing 106 attached to the front cover 104 and in a closed state. In this case the further housing 106 is locked to the front cover using a locking device 140. The user terminal 100 also includes a rear cover, with the rear cover and front cover 104 together forming an outer housing. In FIG. 7 the rear cover is omitted so that the further housing 106 can be seen.

It is a feature of the EPP 112 that it includes a pushbutton on the rear surface, and a pressure sensor operatively linked to the pushbutton. In operation, the pushbutton is maintained in a depressed state, which maintains a pressure greater than a threshold at the pressure sensor. If the pushbutton is released, the pressure sensor detects the associated reduction in pressure and a tamper detection system of the EPP 112 is triggered in response to the detected reduction in pressure. The tamper detection system of the EPP 112 in this case then deletes or modifies a key stored at the EPP 112 in response to the triggering, thus preventing normal operation of the EPP 112.

It is a feature of the embodiment of FIG. 5 that the further housing is arranged so that movement of the further housing 106, for example opening the further housing 106, causes the engagement surface 130 to move away from the pushbutton on the rear surface of the EPP 112, thus causing triggering of the tamper detection system of the EPP 112. Thus, an alternative means for triggering the tamper detection system of the EPP 112 is provided by the arrangement of the further housing 106, in this case in relation to the pressure sensing system, comprising the push button and pressure sensor, of the EPP 112.

In a variant of the embodiment of FIGS. 2 to 7 a detector is provided associated with the locking device 140, which can detect unlocking of the locking device 140 and thus unlocking of the further housing 106. The detector is linked to the tamper detection system of the EPP 112 such that unlocking of the locking device causes triggering of the tamper detection system.

In further variants of the embodiment of FIGS. 2 to 7, the pressure sensor is replaced with another type of detector, for example a movement sensor, which is arranged to detect one or more of opening, unlocking or other movement of the further housing 106, and which causes triggering of the tamper detection system in response to such opening, unlocking or other movement of the further housing 106.

Whilst one particular further housing 40 has been described in relation to FIGS. 1 to 7, the further housing may comprise any suitable housing in alternative embodiments. For example, the housing may be of a one-piece construction, or may comprise two, three or more portions. The housing may be permanently sealed, for example using soldered or welded joints, or may comprise separate attachable and detachable portions attachable using any suitable joining means, for example screws, bolts or adhesive. The housing can be made out of any suitable material, for example plastic or metal and/or lightweight material.

Any suitable tamper detection system can be used to detect tampering with the inner housing in alternative embodiments. In the embodiment of FIG. 1 the tamper detection system comprises an electromechanical arrangement in which a spring physically connects the housing and tamper detection circuitry. However, any suitable arrangement of mechanical, electrical, magnetic, electromagnetic and/or optical components can be used to detect tampering with the housing, in accordance with any techniques available to the skilled person. The tamper detection system may be configured to detect tampering in dependence on measurement of one or more of movement, vibration, light or other electromagnetic radiation, or pressure.

In one embodiment, the tamper detection device 42 comprises a processor and an interface operable to communicate with one or more sensors installed on or within the housing 40.

In alternative embodiments, the triggering of the tamper detection system of the EPP can cause other actions to be performed, as well as or instead of the deletion or modification of the key stored at the EPP. For example, in the embodiment of FIG. 1 the embedded key may be deleted or modified as well as the further key. That would then require the discarding or extraction and reprogramming of the EPP in order to make it operable again. The triggering of the EPP tamper detection system may also cause a message to be sent to a server or other remote device and/or the output of an alarm signal. The triggering of the EPP tamper detection system may cause the terminal to enter a shut down or suspended mode in which further user transactions are unavailable.

In the embodiment of FIG. 1, the processor 4, the data store 6, and the EPP 8 and wiring connecting those components are included in the further housing 40, and other components are provided outside the further housing 40. Any desired component or combination of components can be provided inside the further housing, and can thus be subject to anti-tamper protection, in alternative embodiments. The selection of components to include inside the further housing may depend on the nature of the terminal, and on other security measures provided in the terminal, on the environment in which it is likely to be installed, and on the need for access to the components for example for maintenance purposes.

For example, if the terminal is to be installed outside or in premises that have low security, and the terminal does not include other security measures, for example a secure outer casing, then it may be desired to include more of the user terminal components within the further housing.

Figure 8:
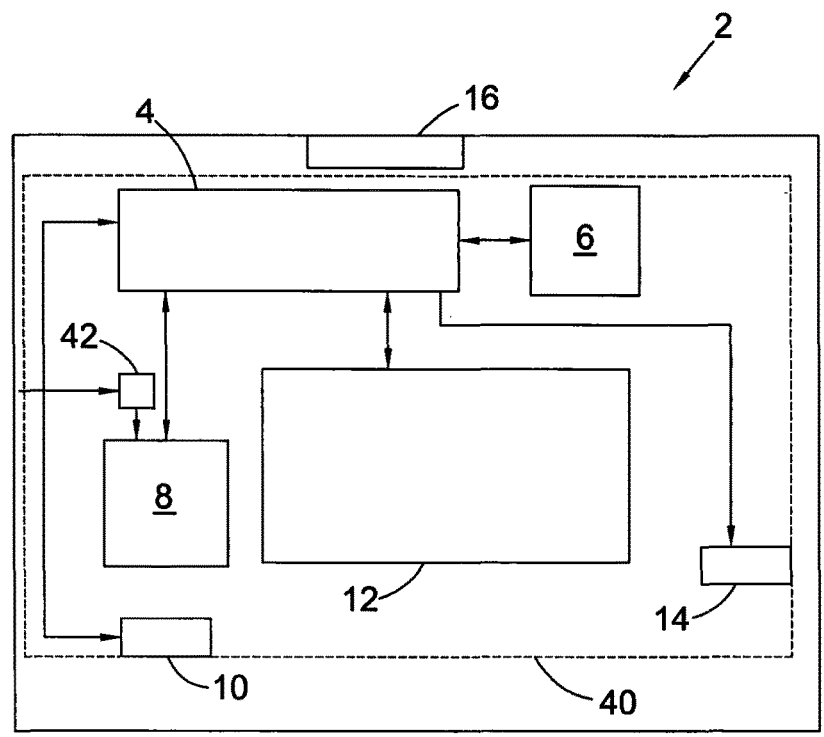
FIG. 8 is a schematic illustration of a user terminal according to an alternative embodiment.

FIG. 8 is an illustration of an alternative embodiment in which the card reader 10, display 12 and printer 14, as well as the processor 4, the data store 6, and the EPP 8, are provided inside the further housing 40 that is subject to anti-tamper protection.

Figure 9:
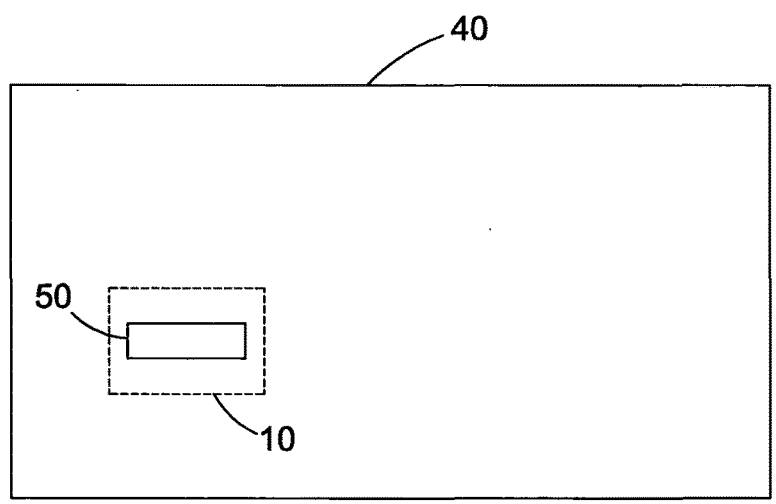
FIG. 9 is a schematic illustration of a housing forming part of a user terminal according to an embodiment.

In the embodiment of FIG. 8, the further housing 40 includes openings that enable access to the card reader device 10 and the printer 14. One such opening 50, which enables access to the card reader device 10, is shown in FIG. 9. A corresponding opening (not shown) is provided in the outer casing of the terminal. The opening 50 enables a user to insert their card into the card reader device 10 without causing tampering to be detected.

An opening is also provided in the embodiment of FIG. 8 to allow paper to be loaded or removed from the printer 14 that is located within the housing 40, again without causing tampering to be detected. Another opening, or transparent portion, can be provided in the housing to enable the display 12 to be viewed by a user.

The openings in the housing can be sized so as to ensure that access to components within the housing via the openings is limited or not possible. The card reader device 10, the printer 14 and/or the display 12 may be positioned so as to wholly or partially block the openings thereby to limit access to the interior of the housing 40. The tamper detection system may be configured so that an attempt to move the card reader device 10, the printer 14 and/or the display 12 relative to the openings causes tampering to be detected.

In alternative embodiments, the tamper detection system associated with the housing 42 is provided with an activation and/or deactivation facility, which allows the activation system to be activated or deactivated. In one embodiment, in which the tamper detection system includes a processor, the processor is connected to a key pad. An operator has a fixed time period (for example, 10 seconds) from starting to tamper with the housing in order to open the housing to enter a deactivation code using the keypad. If the correct deactivation code is not entered within the fixed time period, beginning from the time the tamper detection system first detects tampering, then the tamper detection system sends a trigger signal to the tamper detection system of the EPP to trigger the tamper detection system of the EPP.

In the embodiments of FIGS. 1 and 8, the further housing 40 is an inner housing within the outer housing 20 or casing of the user terminal 2. In alternative embodiments the inner housing 40 may be omitted and/or the further tamper detection system, for example comprising the tamper detection device 42, is arranged to detect tampering with the outer housing 20 or casing of the user terminal.

The described tamper detection measures can be used in ATMs operated by banks or other financial institutions or networks and that do contain large quantities of cash. The tamper detection measures can provide for enhanced security in such ATMs with relatively low cost and effort.

The described tamper detection measures can also be beneficially used in other user terminals that may contain no cash, or relatively little cash compared to standard ATM machines operated by banks or other financial institutions. By providing such tamper detection measures in such other user terminals enhanced security can be provided to protect components of the user terminals without requiring the installation of bulky enhanced outer casings or other physical shielding that is able to resist sustained physical attack. As such terminals may contain little or no cash, such enhanced outer casings or other physical shielding may therefore be omitted.

The encryption apparatus may be an EPP. In alternative embodiments, any other type of encryption apparatus may be used. The key that is deleted in response to tampering can be any suitable key, for example any key whose deletion renders the EPP temporarily or permanently inoperable, for example a session key, private key or master key.

Although the description of various embodiments have included reference to a user's financial transaction card it will be understood that in alternative embodiments any other type of user device associated with an account may be used, for example a fob or RFID device.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A user terminal comprising:
   an encrypting personal identification number (PIN) pad (EPP) of the user terminal, which is configured to perform a cash withdrawal transaction from an account of a user, comprising a housing and a pushbutton located on a surface of the EPP;
   a tamper detection system of the EPP comprising a triggering system comprising at least one detector configured to trigger the tamper detection system in response to tampering with the housing of the EPP, wherein the at least one detector comprises at least one of a resistive, inductive or capacitive detector and at least one switch or relay;
   a central processing unit (CPU) and memory for controlling operation of the user terminal;
   a further housing distinct from the housing, wherein the EPP is located within the further housing and at least the CPU for controlling operation of the user terminal is also located within the further housing, and
   at least one further detector comprising the pushbutton for detecting tampering with the further housing, wherein the at least one further detector is configured to trigger the tamper detection system of the EPP in response to tampering with the further housing causing a reduction in pressure to be detected associated with a release of the pushbutton, and
   at least one of an activation device or a deactivation device for respectively activating or deactivating the at least one further detector;
   wherein the user terminal is arranged such that the detector triggers the tamper detection system of the EPP to modify or delete a key stored at the EPP, thereby providing modification or deletion of the key stored at the EPP in response to tampering with said housing of the EPP;
   wherein the user terminal is arranged such that the further detector triggers the tamper detection system of the EPP to modify or delete a key stored at the EPP, thereby providing modification or deletion of the key stored at the EPP in response to tampering with said further housing of the EPP within which the EPP and CPU are located.

2. The user terminal according to claim 1, wherein the at least one further detector is configured to provide a trigger signal to an input of the tamper detection system.

3. The user terminal according to claim 1, wherein the at least one further detector is configured to trigger the tamper detection system in response to at least one of opening or unlocking the further housing.

4. The user terminal according to claim 1, wherein the further housing is arranged so that at least one of opening or unlocking the further housing causes the at least one further detector to detect at least one of movement or pressure thereby causing triggering of the tamper detection system.

5. The user terminal according to claim 1, wherein the user terminal further comprises at least one of a motherboard, a card reader, a touch screen and a printer located wholly or partly within the further housing.

6. The user terminal according to claim 1, wherein the further housing comprises an opening to allow access to a component within the further housing.

7. The user terminal according to claim 1, wherein the user terminal comprises a card reader located within the further housing, and the further housing comprises an opening aligned with the card reader to allow insertion of a card through the further housing into the card reader.

8. The user terminal according to claim 1, wherein the user terminal comprises a printer located within the further housing, and the further housing comprises an opening aligned with the printer to allow loading of paper into the printer.

9. The user terminal according to claim 1, wherein the user terminal comprises wiring connecting the EPP to a motherboard or central processing unit (CPU) for controlling operation of the user terminal and the wiring is located wholly within the further housing.

10. The user terminal according to claim 1, further comprising at least one of a motherboard, a card reader, a touch screen and a printer.

11. The user terminal according to claim 1, wherein the tamper detection system comprises at least one electrical, magnetic or electromagnetic detection system for detecting a change in a property indicative of tampering.

12. The user terminal according to claim 1, comprising both the activation device and the deactivation device for activating and deactivating the at least one further detector.

13. The user terminal according to claim 1, wherein the triggering of the tamper detection system of the EPP comprises rendering the EPP temporarily or permanently unable to encrypt.

14. The user terminal according to claim 1, wherein the key comprises at least one of a session key, a master key or a private key.

15. The user terminal according to claim 1, comprising a payment terminal, an automated fuel dispenser, or a product dispensing machine.

16. The user terminal according to claim 1, comprising an Automated Teller Machine (ATM).

17. The user terminal according to claim 1, wherein: the housing is a secure housing.

18. The user terminal according to claim 1, wherein the at least one further detector comprises at least one of a resistive, inductive or capacitive detector.

19. The user terminal according to claim 1, wherein the at least one further detector comprises at least one switch or relay.

20. The user terminal according to claim 1, comprising the activation device for activating the at least one further detector.

21. The user terminal according to claim 1, comprising the deactivation device for deactivating the at least one further detector.

22. A method of detecting tampering with a user terminal comprising:
   receiving user data associated with performing a cash withdrawal transaction from an account of the user using an encrypting personal identification number (PIN) pad (EPP) of the user terminal, wherein the EPP comprises a secure housing and a pushbutton located on a surface of the EPP and a tamper detection system comprising a triggering system;
   triggering, by at least one detector of the EPP, the tamper detection system in response to detecting tampering with the housing of the EPP, wherein the at least one detector comprises at least one of a resistive, inductive, optical or capacitive detector and at least one switch or relay;
   detecting, by at least one further detector of the user terminal comprising the pushbutton, tampering with a further housing of the user terminal which is distinct from the housing, wherein the EPP is located within the further housing and at least the central processing unit (CPU) for controlling operation of the user terminal is also located wholly or partly within the further housing;

triggering, by the at least one further detector, the tamper detection system of the EPP in response to tampering with the further housing causing a reduction in pressure to be detected associated with a release of the push-button, wherein the at least one further detector can be at least one of activated or deactivated using respectively an activation device or a deactivation device of the user terminal;

wherein triggering the tamper detection system further comprises:

triggering, by the detector, the tamper detection system of the EPP to modify or delete a key stored at the EPP in response to detection of tampering with the housing of the EPP, and triggering, by the further detector, the tamper detection system of the EPP to modify or delete a key stored at the EPP in response to detection of tampering with the further housing within which the EPP and CPU are located.

\* \* \* \* \*